US00RE49799E

(19) United States
(12) Reissued Patent
Gregory

(10) Patent Number: US RE49,799 E
(45) Date of Reissued Patent: Jan. 16, 2024

(54) STABILIZING ACCESSORY SYSTEM FOR A TRAILER FRAME

(71) Applicant: Dock N Stow LLC, Highlands Ranch, CO (US)

(72) Inventor: Mark Gregory, Highlands Ranch, CO (US)

(73) Assignee: DOCK N STOW LLC, Highlands Ranch, CO (US)

(21) Appl. No.: 17/361,251

(22) Filed: Jun. 28, 2021

Related U.S. Patent Documents

Reissue of:

(64) Patent No.: 10,906,512
Issued: Feb. 2, 2021
Appl. No.: 16/361,608
Filed: Mar. 22, 2019

U.S. Applications:

(60) Provisional application No. 62/651,857, filed on Apr. 3, 2018.

(51) Int. Cl.
*B60T 3/00* (2006.01)
*B60D 1/66* (2006.01)
(Continued)

(52) U.S. Cl.
CPC ..... *B60T 3/00* (2013.01); *B60D 1/66* (2013.01); *B60D 1/665* (2013.01); *B60S 9/04* (2013.01); *B62D 63/08* (2013.01)

(58) Field of Classification Search
CPC .. B60T 3/00; B60D 1/66; B60D 1/665; B60S 9/00; B60S 9/04; B60S 9/06; B60S 9/08; B60S 9/16; B60S 9/18; B62D 63/08
See application file for complete search history.

(56) References Cited

U.S. PATENT DOCUMENTS 770,510 A * 9/1904 Stullken ..... B60T 3/00 D12/217
1,837,657 A * 12/1931 Fedderman ..... B60T 3/00 188/32
(Continued)

FOREIGN PATENT DOCUMENTS

CA 2512381 A1 * 1/2007 ..... B60D 1/06
CN 204110065 U * 1/2015
(Continued)

OTHER PUBLICATIONS

English translation of CN-204110065-U retrieved from EPO's Espacenet website.*
English translation of DE-102007028764-A1 retrieved from EPO's Espacenet website.*
English translation of KR-200428433-Y1 retrieved from Google Patents.*
(Continued)

*Primary Examiner* — Peter C English
(74) *Attorney, Agent, or Firm* — Dickinson Wright PLLC

(57) ABSTRACT

A system and methods for stabilizing a towed trailer include a stabilizing accessory system that both stabilizes the trailer and stows upon a frame of the trailer for transport. The system includes a wheel chock that detachably attaches to a stabilizing block. The stabilizing block features an elevated wheel dock configured to receive a jack wheel of the trailer, a post recess configured to receive a square or round jack post of the trailer, and a plate recess configured to receive a plate jack stand of the trailer. The stabilizing block may be secured to a frame of the trailer via a securement strap or via a switchable magnet embedded within the block. The wheel chock is configured to immobilize a trailer tire and may secure to the frame via its attachment to the stabilizing block, supplemented by a magnet embedded in its bottom surface. Other embodiments are disclosed.

18 Claims, 16 Drawing Sheets

(51) Int. Cl.
*B62D 63/08* (2006.01)
*B60S 9/04* (2006.01)

(56) References Cited

U.S. PATENT DOCUMENTS

| | | | | | |
|---|---|---|---|---|---|
| 2,272,334 | A * | 2/1942 | Laurent | B66F 7/243 | 254/88 |
| 2,675,210 | A * | 4/1954 | Lowber | B66F 7/243 | 254/1 |
| 3,612,575 | A * | 10/1971 | Stewart | B62D 13/06 | 280/474 |
| 4,911,460 | A * | 3/1990 | DePaula | B60D 1/36 | 254/120 |
| 6,499,851 | B1 * | 12/2002 | Kelly et al. | B60R 1/003 | 359/872 |
| 8,534,631 | B2 * | 9/2013 | Shirey | B60S 9/22 | 248/346.01 |
| 10,807,572 | B1 * | 10/2020 | Griswold | B60T 3/00 | |
| 2006/0016645 | A1 * | 1/2006 | Chrisco | B60T 3/00 | 188/32 |
| 2012/0118680 | A1 * | 5/2012 | Giglio | B60T 3/00 | 188/32 |
| 2014/0014445 | A1 * | 1/2014 | Talynn | B60T 3/00 | 188/32 |
| 2014/0325770 | A1 * | 11/2014 | Somers et al. | B66F 7/243 | 14/69.5 |
| 2015/0369420 | A1 * | 12/2015 | Poynter | B62B 13/18 | 248/647 |
| 2018/0162329 | A1 * | 6/2018 | Grosz | B60T 3/00 | |

FOREIGN PATENT DOCUMENTS

| | | | | |
|---|---|---|---|---|
| CN | 105504496 | A * | 4/2016 | |
| DE | 102007028764 | A1 * | 4/2009 | |
| GB | 2229153 | A * | 9/1990 | B60R 99/00 |
| GB | 2501698 | A * | 11/2013 | |
| KR | 200428433 | Y1 * | 10/2006 | |
| WO | WO-03101799 | A1 * | 12/2003 | |

OTHER PUBLICATIONS

Translation, CN 105504496 A, Liu Xun. (Year: 2016).*
Abstract of websites featuring related products.
Screenshot of website at https://www.fastwaytrailer.com/flip-jack-feet accessed on Mar. 21, 2019.
Screenshot of website at https://www.huskytow.com accessed on Mar. 21, 2019.
Screenshot of website at http://www.camco.net/stabilizer-jack-pad-standard-6-2-x6-2-pad-4pack-44595 accessed on Mar. 21, 2019.
Screenshot of website at https://trilynx.com/products/lynx-cap-4-pack accessed on Mar. 21, 2019.
Screenshot of website at https://trilynx.com/products/lynx-levelers-4-pack accessed on Mar. 21, 2019.
Screenshot of website at https://trilynx.com/products/lynx-chokr-dock accessed on Mar. 21, 2019.
Screenshot of website at http://www.dyersonline.com/hand-e-blok-trailer-jack-stand.html accessed on Mar. 21, 2019.
Screenshot of website at https://andersenhitches.com/Products/3608m----trailer-jack-block.aspx accessed on Mar. 21, 2019.
Screenshot of website at https://www.amazon.com/Camco-44632-Wheel-Dock/dp/B0007TQWJM accessed on Mar. 21, 2019.
Screenshot of website at www.cynder.com accessed on Mar. 21, 2019.
Screenshot of website at https://www.hannarv.com/P/1500/MTIIndustriesSATungNChokTrailerTongueJackWheelDock accessed on Mar. 21, 2019.
Screenshot of website at https://www.autozone.com/hitches-balls-mounts-and-hitch-accessories/tire-wheel-chock/reese-towpower-tire-wheel-chock/969053_0 accessed on Mar. 21, 2019.
Screenshot of website at https://andersenhitches.com/Products/3620--rapid-jack.aspx accessed on Mar. 21, 2019.
Screenshot of website at http://www.camco.net/tongue-jack-stand-plastic-bilingual-44635 accessed on Mar. 21, 2019.
Screenshot of website at http://www.valterra.com/product/trailer-tongue-jack-stand-red-bulk/ accessed on Mar. 21, 2019.
Screenshot of website at https://www.walmart.com/ip/Jack-Drop-Leg-Foot-Pad-for-2-Standard-Trailer-Camper-Jacks-26026/142169593 accessed on Mar. 21, 2019.

* cited by examiner

STABILIZING ACCESSORY SYSTEM FOR A TRAILER FRAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO PENDING PRIOR PATENT APPLICATION

This application claims the benefit under 35 U.S.C. 119 (e) of U.S. Provisional Patent Application No. 62/651,857, filed Apr. 3, 2018 by Mark Gregory, for "STABILIZING ACCESSORY SYSTEM FOR A TRAILER FRAME," which patent application is hereby incorporated herein by reference.

BACKGROUND

Currently, the jack wheel posts and attached jack wheels or plate jack stands of hauling trailers are supported in a number of insufficient ways when the trailers are unhooked from the towing vehicle. For example, some trailer owners simply allow the jack post, the jack wheel, or the flat foot or plate jack stand attached to the post to rest upon the ground. Over time, there is a potential for the post, the wheel, and even the foot to sink into the ground, making it difficult to later reattach the trailer to the towing vehicle.

Other owners carry some type of jack post, wheel, or foot stabilizing accessory in the towing vehicle. Such stabilizing accessories currently include, by way of limited example, one or more blocks of wood, stackable pads or blocks, cinder blocks, a variety of jack post sheaths, boots, or feet, and a variety of wheel platforms or docking stations to be stacked or positioned beneath the jack post or the jack wheel. Many of these existing stabilizing accessories must be transported in the towing vehicle, rendering the accessories inconvenient and prone to loss or damage. Others must be directly incorporated into the trailer jack itself. Moreover, these stabilizing accessories generally accommodate a specific trailer jack geometry and do not exhibit the flexibility or adjustability to stabilize or support more than one of a particular jack post, jack wheel, or plate jack stand.

Similarly, current wheel or tire chocks exist as entirely separate components from the stabilizing devices discussed above. These chocks are typically transported within the towing vehicle along with the stabilizing accessory, which is inconvenient and space consumptive, and also risks loss or damage to the tire chock.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a stabilizing accessory system for a trailer. The stabilizing accessory system may include a stabilizing block and a wheel chock detachably attached to the [wheel chock] *stabilizing block*. The stabilizing block may include (1) a wheel dock configured to receive and retain a jack wheel of the trailer; (2) a post cutout configured to receive and retain a distal end of a jack post of the trailer; (3) a plate recess configured to receive and retain a plate jack stand of the trailer; and (4) a first securement mechanism for securing the stabilizing block to a frame of the trailer. The wheel chock may be configured to immobilize a tire of the trailer, and may include a second securement mechanism for securing the wheel chock to the frame of the trailer.

Another embodiment provides a stabilizing accessory system for a towed trailer and may include a wheel chock detachably attached to a trailer stabilizing accessory, where the trailer stabilizing accessory is configured to selectively elevate and support each of a jack wheel, a jack post, and a plate jack stand, and where the wheel chock and the trailer stabilizing accessory attach directly to a frame of the towed trailer for transport when not in use.

Yet another embodiment provides a method of stabilizing a towed trailer using a trailer stabilizing accessory system including a wheel chock and a stabilizing block. The method may include the following steps: (1) when the towed trailer is not in transport: (a) using the stabilizing block to stabilize one of a square jack post, a round jack post, a jack wheel, or a plate jack stand of the towed trailer; and (b) using the wheel chock to stabilize a tire of the towed trailer; and (2) when the towed trailer is in transport: (a) securing the stabilizing block and the wheel chock to a frame of the towed trailer.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to the convenient and effective stabilization of a variety of trailer frame geometries, including trailers featuring a bare square or round jack post, a jack post terminating in a jack wheel, and/or a jack post terminating in a jack post foot or plate jack stand. As discussed above in the Background section, existing trailer stabilization mechanisms present a number of challenges in that they are inconvenient and oftentimes must be carried in the towing vehicle separate from the trailer to be stabilized after the trailer is unhitched. The existing mechanisms also fail to form any kind of integrated system between the jack stabilization accessories designed to stabilize the post, jack wheel, and/or post foot and the tire or wheel chock designed to immobilize at least one of the trailer's tires. As a result, when existing stabilizing structures and tire chocks are transported in the towing vehicle, they are likely to be separated from one another, to be lost or damaged in transport, or to be left unused due to the inconvenience of finding and accessing them when they are needed.

In addition, embodiments of the trailer frame stabilizing accessory system disclosed herein are designed to be conveniently transported directly on the trailer frame itself as an integrated unit including a stabilizing block and a tire/wheel chock. Varying embodiments are configured to attach to a range of different trailer frame widths for transport and, in use, provide a raised stabilization height that reduces the amount of effort a user must invest in cranking the jack post to raise the stabilized trailer for attachment to the towing vehicle.

Figure 1:
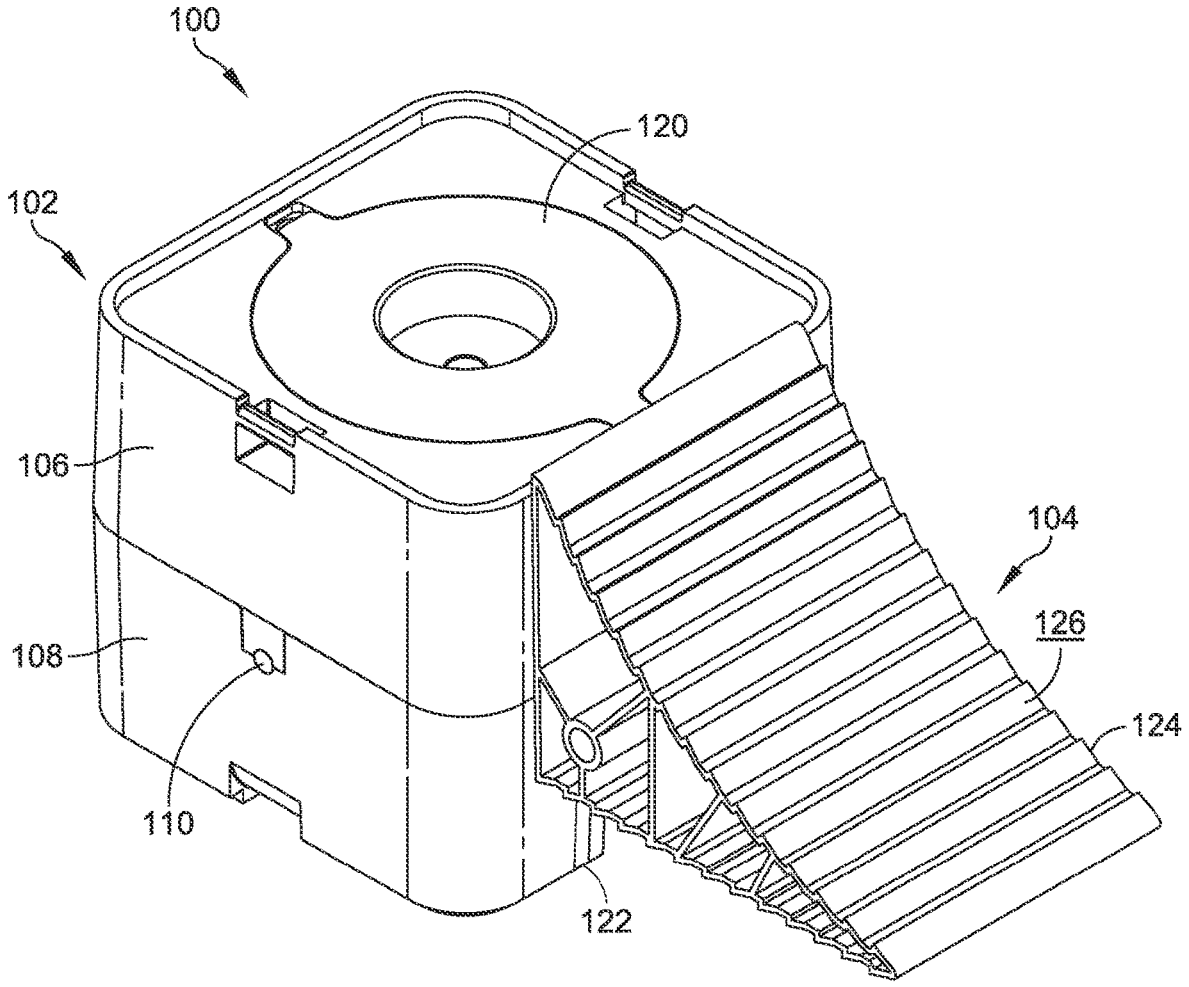
FIG. 1 illustrates a perspective view of one embodiment of a trailer stabilizing accessory system including a stabilizing block and a detachably attached wheel chock assembly that are both configured for storage directly upon a trailer frame.
Figure 2:
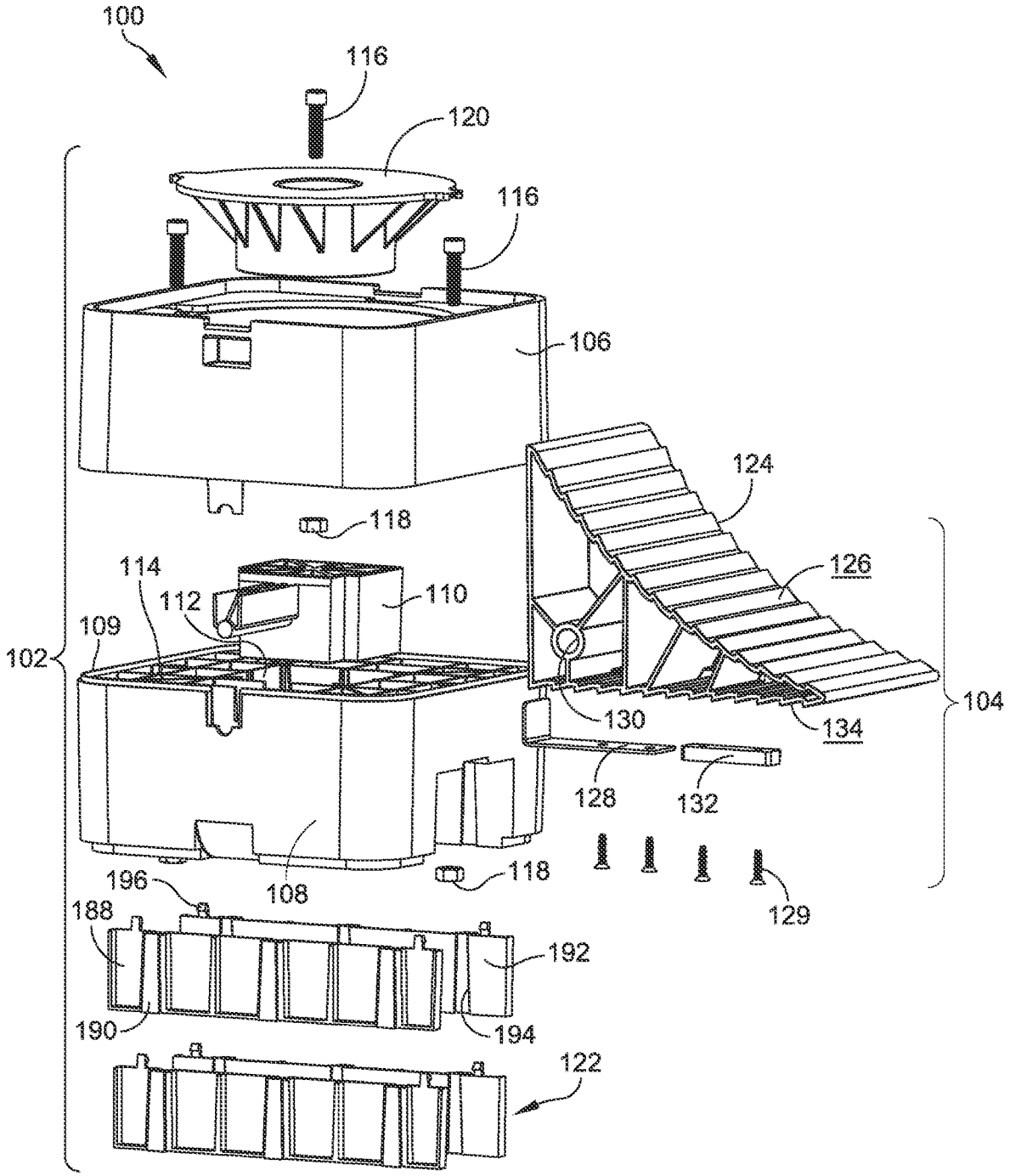
FIG. 2 illustrates an exploded view of the trailer stabilizing accessory system of FIG. 1.
Figure 3:
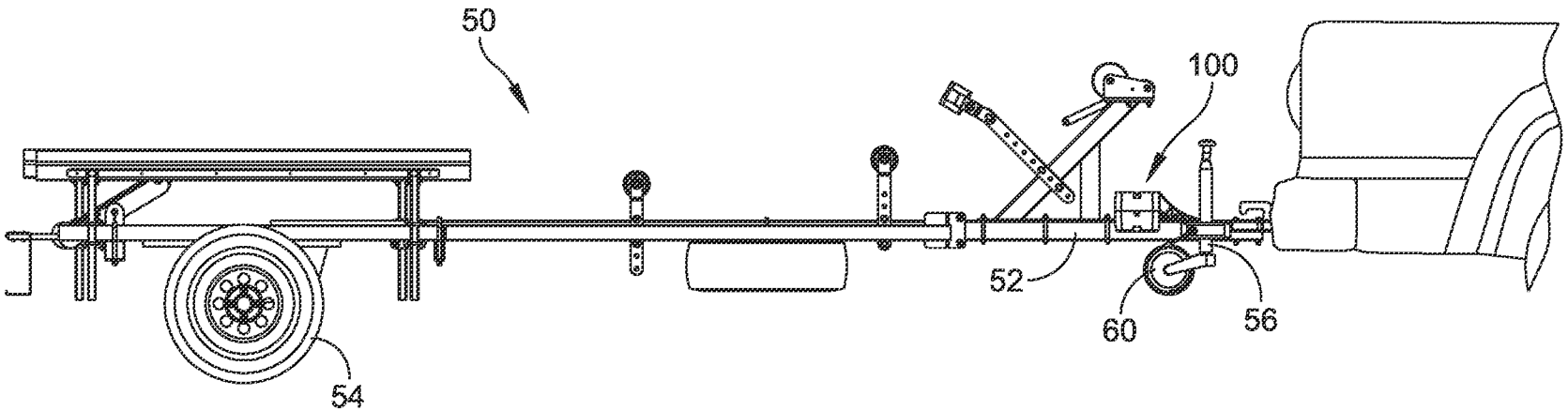
FIG. 3 illustrates a side plan view of the stabilizing accessory system of FIGS. 1-2, as disposed upon a trailer frame for transport.

Turning to the exemplary embodiments shown in the figures, FIGS. 1-2 illustrate perspective and exploded views, respectively, of one embodiment of a trailer stabilizing accessory system 100 for use with and transport upon a frame 52 of a towed trailer 50, as shown in FIG. 3. In this embodiment, the stabilizing accessory system 100 may include a stabilizing block 102 and a detachably attached tire or wheel chock assembly 104. The stabilizing block 102 may include an upper body 106 that attaches to a lower body 108 in any appropriate manner including, for example, two socket head screws 116 and corresponding hex nuts 118.

In one embodiment, the lower body 108 may include an upper perimeter lip 109 configured to extend into the [lower] *upper* body 106 when the upper and lower bodies are stacked. The upper upper perimeter lip 109 may act to prevent moisture creep into the assembled stabilizing block 102. A top insert 120 may detachably attach to the upper body 106 in any appropriate manner including, for example, a press or snap fit or via an additional socket head screw 116 and hex nut 118, as shown.

In this embodiment, each of the upper and the lower bodies 106, 108 may form a ribbed interior to provide light-weight structural integrity capable of supporting at least the tongue weight of a class IV hitch, or 1400 lbs. A ribbed interior 114 of the lower body, as shown in FIG. 2, may feature an insert compartment 112 configured to receive a rib pack insert 110. Alternatively, the ribbed interior 114 of the lower body 108 may span an entirety of the interior 114 of the lower body, without the insert compartment 112 and the rib pack insert 110, depending, on manufacturing methods, preferences, capabilities, and/or costs.

The stabilizing block 102 may also include multiple tension-fit spacers 122 configured for insertion into the lower body 108 in a manner that modifies the lower body 108 as necessary to accommodate a variety of trailer frame rail widths for transport, as detailed further below.

Figure 4:
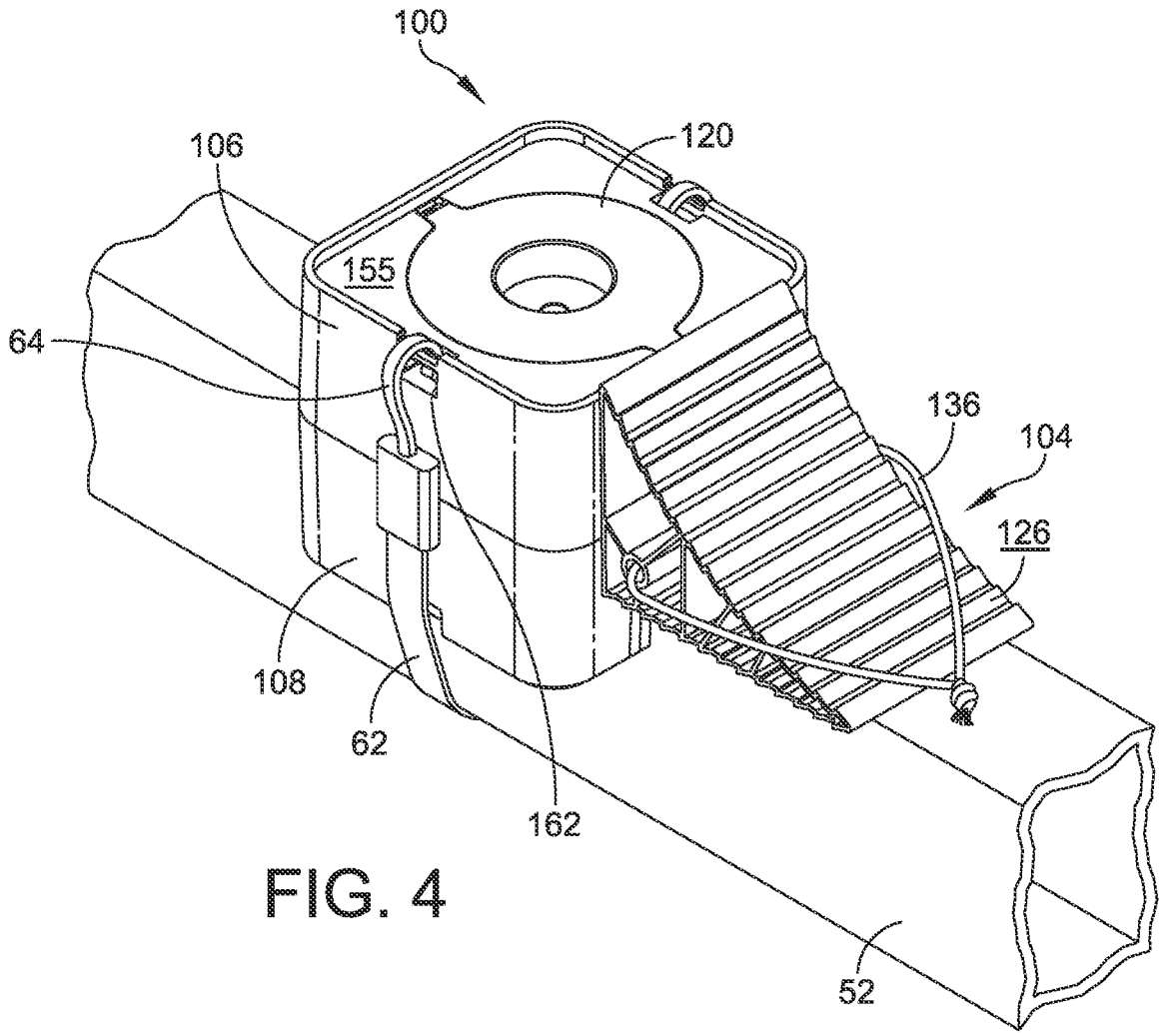
FIG. 4 illustrates a perspective view of the stabilizing accessory system of FIGS. 1-2, as stowed upon a trailer frame using a securement strap.
Figure 23:
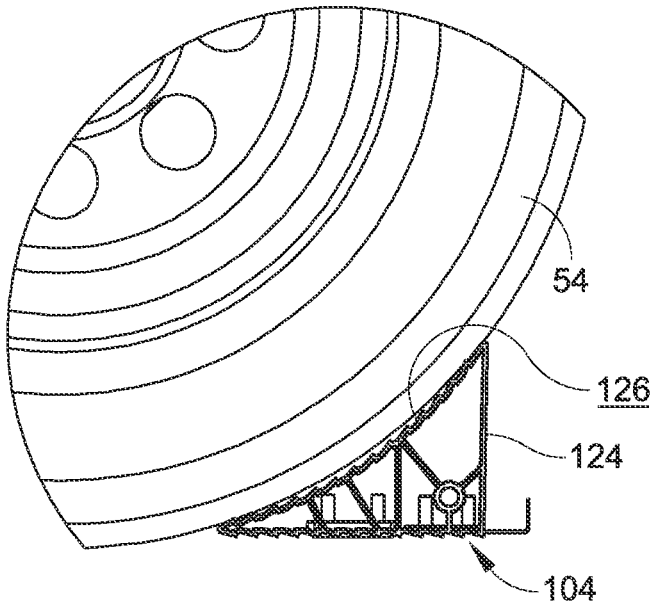
FIG. 23 illustrates a side plan view of the wheel chock assembly of FIGS. 1-2, as disposed adjacent to a tire of the trailer of FIG. 3.

As shown in FIGS. 1-4 and in this embodiment, the stabilizing accessory system 100 may also include the wheel chock assembly 104, configured for detachable attachment to the lower body 108 of the stabilizing block 102 via [a] an integration hook 128. In one embodiment, the wheel chock assembly 104 may include a wheel chock 124 having an upper surface 126 that features a concave, stepped curvature configured for placement adjacent to a trailer tire 54 of the towed trailer 50 (FIG. 3), as shown in FIG. 23, and a bottom surface 134 incorporating the integration hook 128 as well as a recessed passive magnet 132 (e.g., a commercially available, rectangular neodymium magnet) configured to further secure the assembly 100 to the frame 52 of the towed trailer 50, as shown in FIG. 4. In one embodiment, a small switchable magnet (not shown) may be incorporated into the wheel chock 124, enabling the wheel chock 124 to be attached to any steel frame without attachment to the stabilizing block 102.

In one embodiment, the integration hook 128 may be a 90-degree integration hook designed to interface with the stabilizing block 102, as shown. In other embodiments, the integration hook 128 or other integration mechanism configured to detachably attach the stabilizing block 102 and the wheel chock assembly 104 may take any appropriate size, shape, type, and/or configuration to effectively and detachably attach the wheel chock 124 to the stabilizing block 102. For example, the integration hook may comprise a built-in projection (e.g., a continuation of the manufacturing mold for the wheel chock 124) extending from the bottom surface 134 of the wheel chock 124 and configured to connect with the bottom of the block 102. In this embodiment, the passive magnet 132 and the 90-degree integration hook 128 may be attached to the bottom surface 134 of the wheel chock 124 in any appropriate manner, including via an adhesive, a snap fit, an interference fit, or via one or more fasteners 129, as shown. The wheel chock assembly 104 may also include a through hole 130 configured to receive a rope or tether 136, which may be used to pull the wheel chock assembly 104 from beneath the tire 54 after use.

Figure 5:
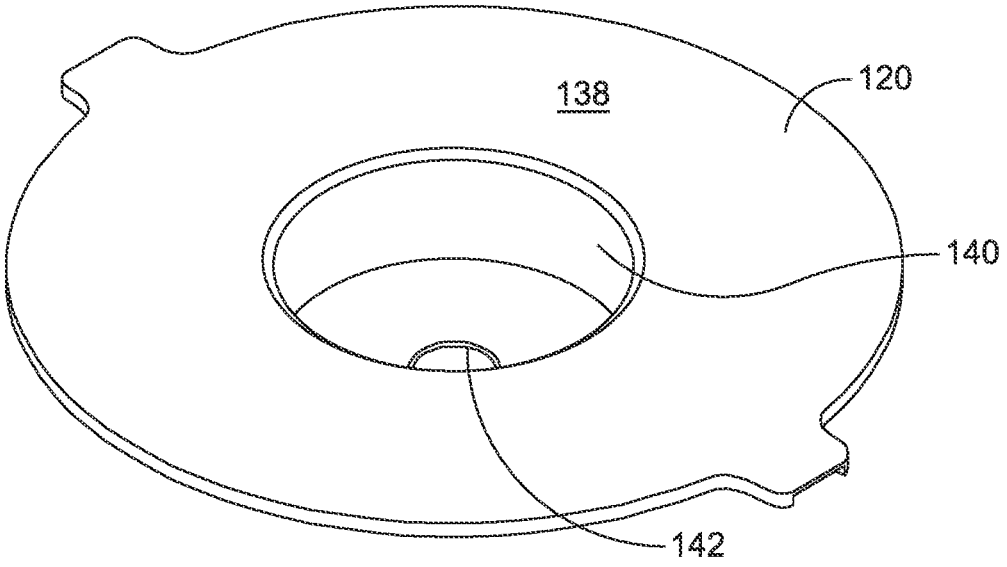
FIGS. 5-6 illustrate respective top and bottom perspective views of one embodiment of a top insert of the stabilizing block of FIGS. 1-2.
Figure 6:
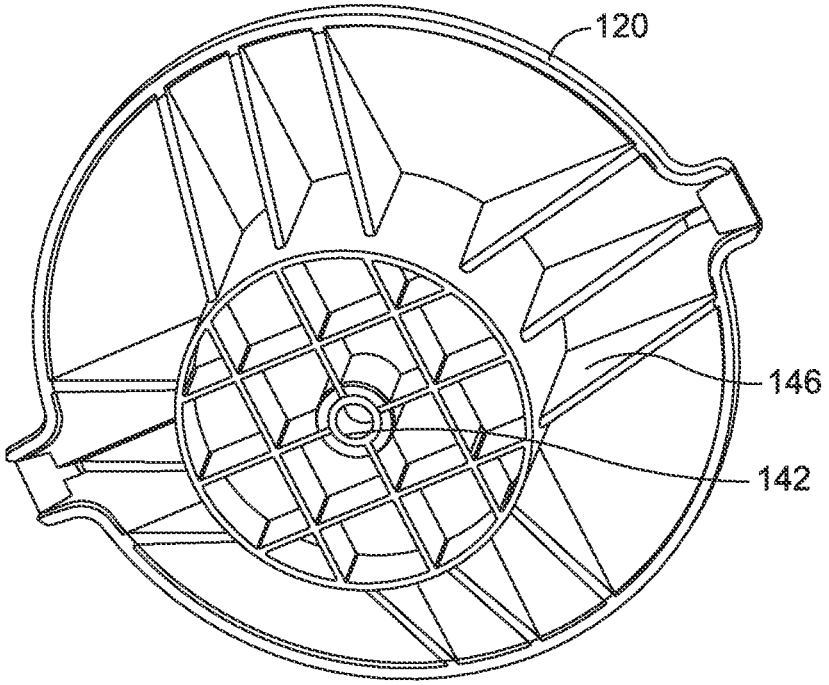
Figure 21:
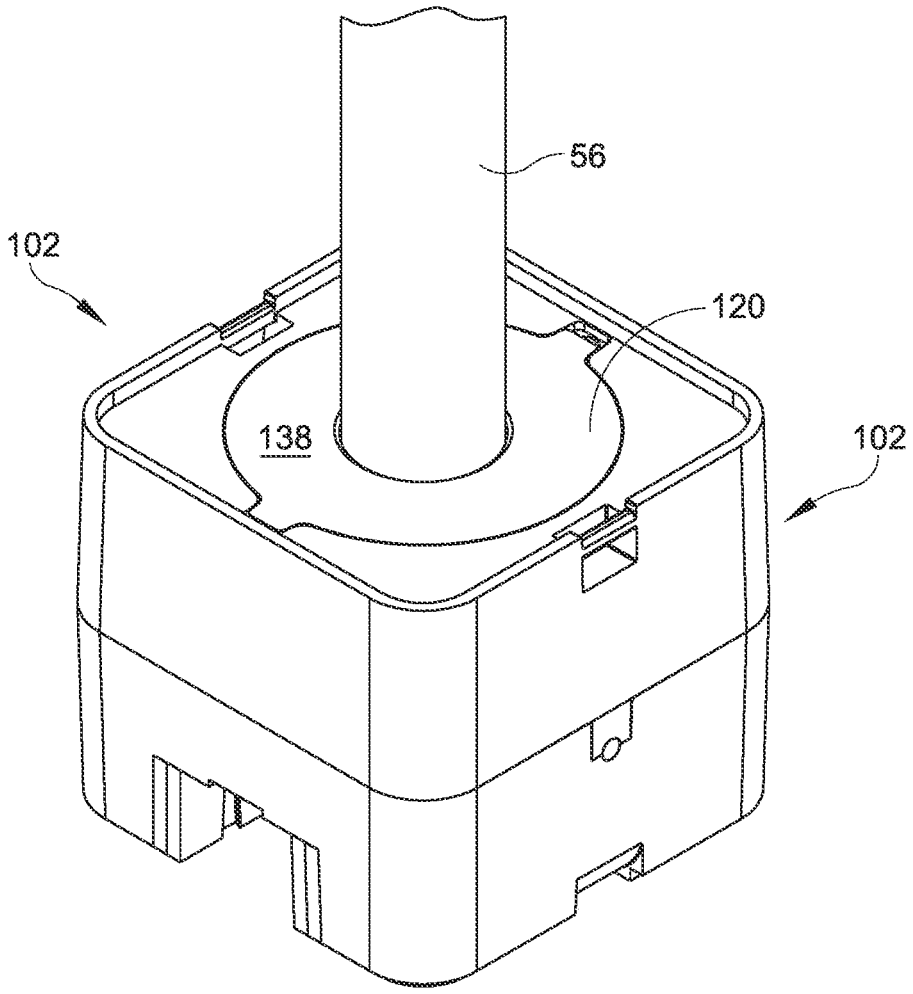
FIG. 21 illustrates a perspective view of a bare distal end of a jack post of the trailer of FIG. 3, as stabilized upon the stabilizing block of FIGS. 1-2.
Figure 22:
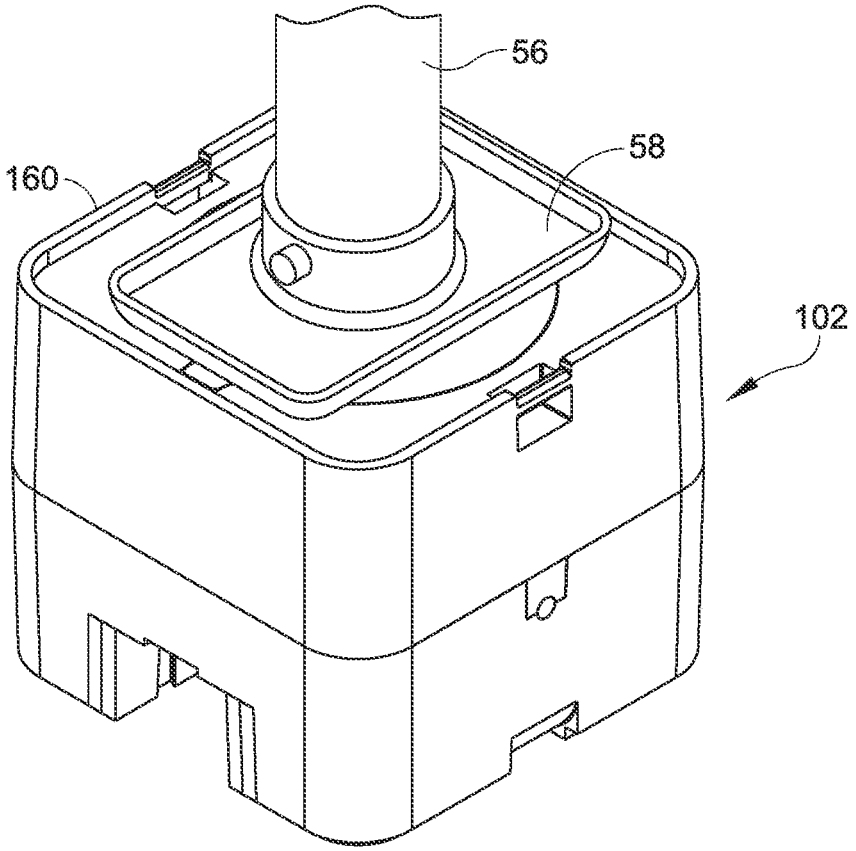
FIG. 22 illustrates a perspective view of a plate jack stand, as stabilized upon the stabilizing block of FIGS. 1-2.

Turning to the details of each of the components of the stabilizing accessory system 100 discussed above, FIGS. 5-6 illustrate top and bottom perspective views of one embodiment of the top insert 120. In this embodiment, the top insert 120 may be configured for flush insertion into and attachment to the upper body 106 of the stabilizing block 102, as shown in FIGS. 1 and 4. In one embodiment, the top insert 120 may have a top surface 138 that forms a round recess 140 configured to receive a bare distal end of a round jack post 56 of the towed trailer 50 that does not terminate in a plate/foot or wheel at its distal end, as shown in FIG. 21. Alternatively, a plate jack stand or foot 58 may be disposed upon the top surface 138 of the top insert 120 in a manner that overlaps the round recess 140, as shown in FIG. 22.

In this embodiment, the round recess 140 may have a diameter of 2.5 inches and a depth of 1 inch. Other embodiments may feature any appropriate and/or desired dimensions or configurations. As discussed above, the top insert 120 may attach to the upper body [102] *106* via one of the socket head screws 116 through an attachment hole 142 or, alternatively, the insert 120 may attach via a press fit, a snap fit, or any other appropriate attachment mechanism or means. A bottom side of the insert may include a number of ribs 146 to provide lightweight structural support.

Figure 7:
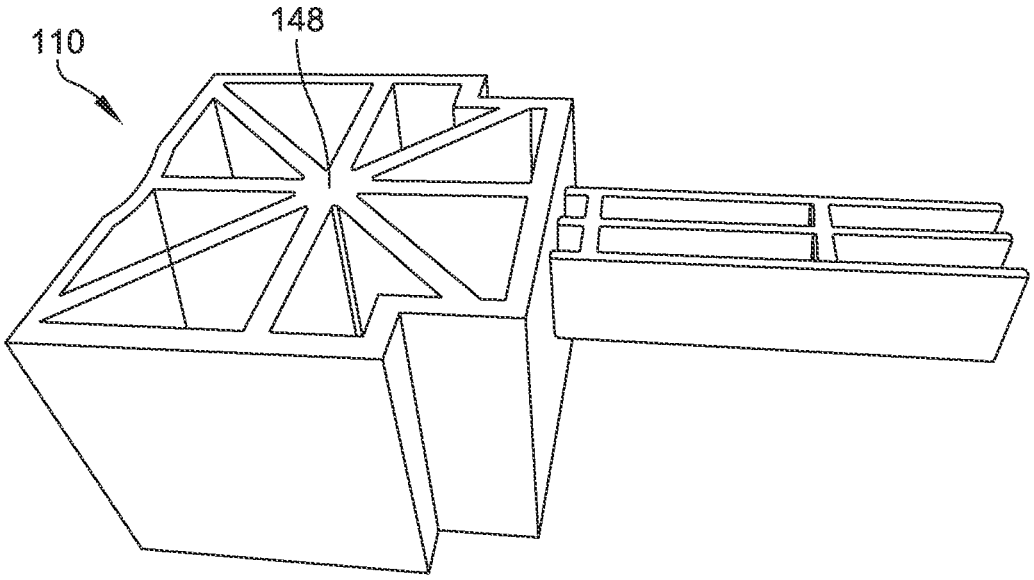
FIGS. 7-8 illustrate respective top and bottom perspective views of one embodiment of a rib pack insert of the stabilizing block of FIGS. 1-2.
Figure 8:
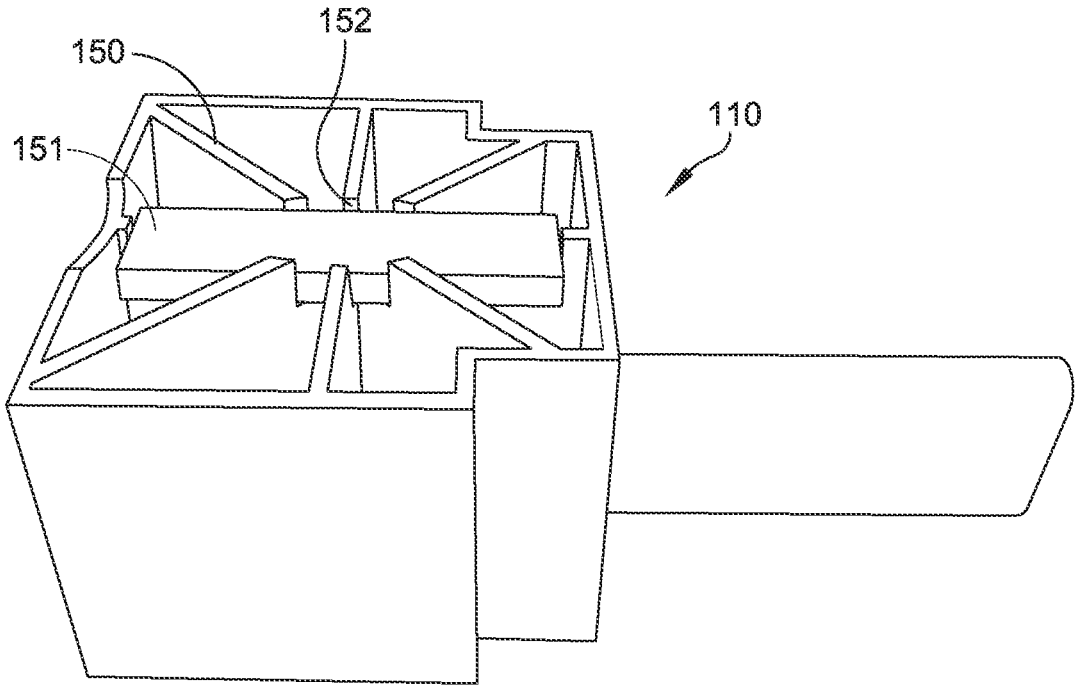

FIGS. 7-8 illustrate top and bottom perspective views of one embodiment of the removeable rib pack 110, respectively. In this embodiment, the rib pack 110 may be a structurally ribbed insert configured to fit within the insert compartment 112 of the lower body 108 (FIG. 2) of the stabilizing block 102 to enhance the structural integrity of the lower body 108. The rib pack 110 may have a top side 148 and a bottom side 150. In one embodiment, the bottom side 150 may include a magnet recess 152 configured to receive a passive magnet 151. In one embodiment, the passive magnet 151 may be of the same type or similar to the recessed passive magnet 132 of the wheel chock 124, discussed above. For instance, the magnet 151 may be a commercially available, epoxy-coated rectangular neodymium magnet from, for example, Sunnyfore Magnet Company Limited. The rectangular magnet 151 may assist in preventing the stabilizing block 102 from sliding when installed upon the trailer frame 52, as shown in FIG. 4. In another embodiment, the interior 114 of the lower body 108 (FIG. 2) may be comprised entirely of ribs such that the removeable rib pack is unnecessary and therefore excluded. In some embodiments, the rib pack 110 may be replaced with a switchable magnet, as discussed below in relation to FIG. 17.

FIGS. 9-13 illustrate top, front, rear, left/right, and bottom-plan views of the stabilizing block 102, respectively, with the top insert 120 removed. In one embodiment, the stabilizing block 102 may have a footprint encompassing a length, l, of 7 inches, a width, w, of 7 inches, and a height, h, of 6.25 inches. In other embodiments, the stabilizing block 102 may have any appropriate dimensions necessary for stowing and transport upon and then stabilizing a jack of a trailer frame at an elevated height. If necessary and/or desired, two stabilizing blocks 102 may be stacked to provide a desired stabilization height.

Figure 9:
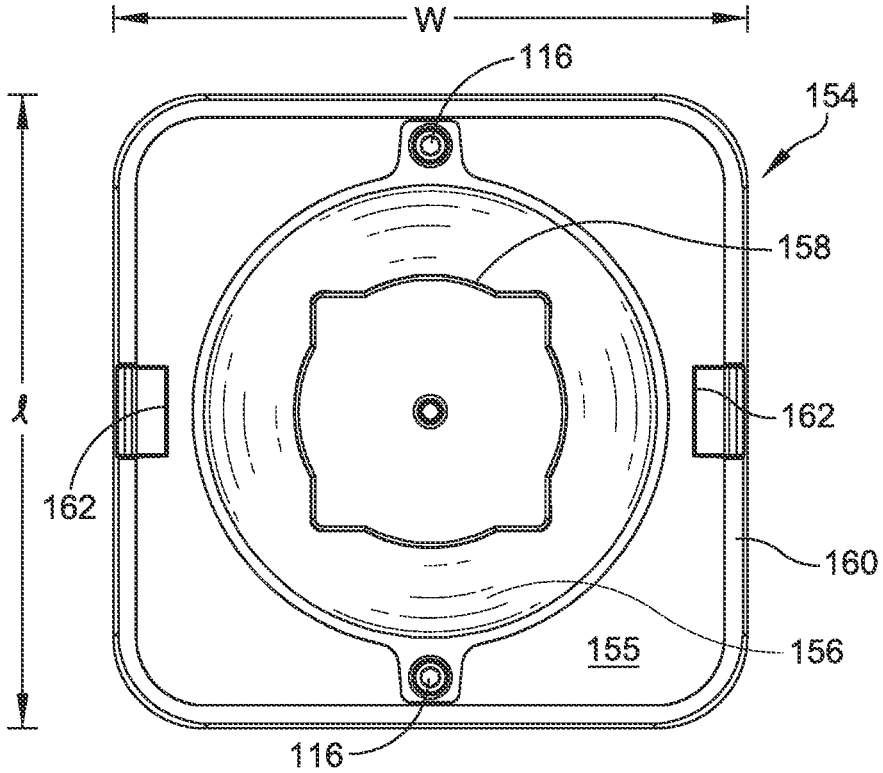
FIG. 9 illustrates a top plan view of the stabilizing block of FIGS. 1-2, with the top insert of FIGS. 5-6 removed.
Figure 20:
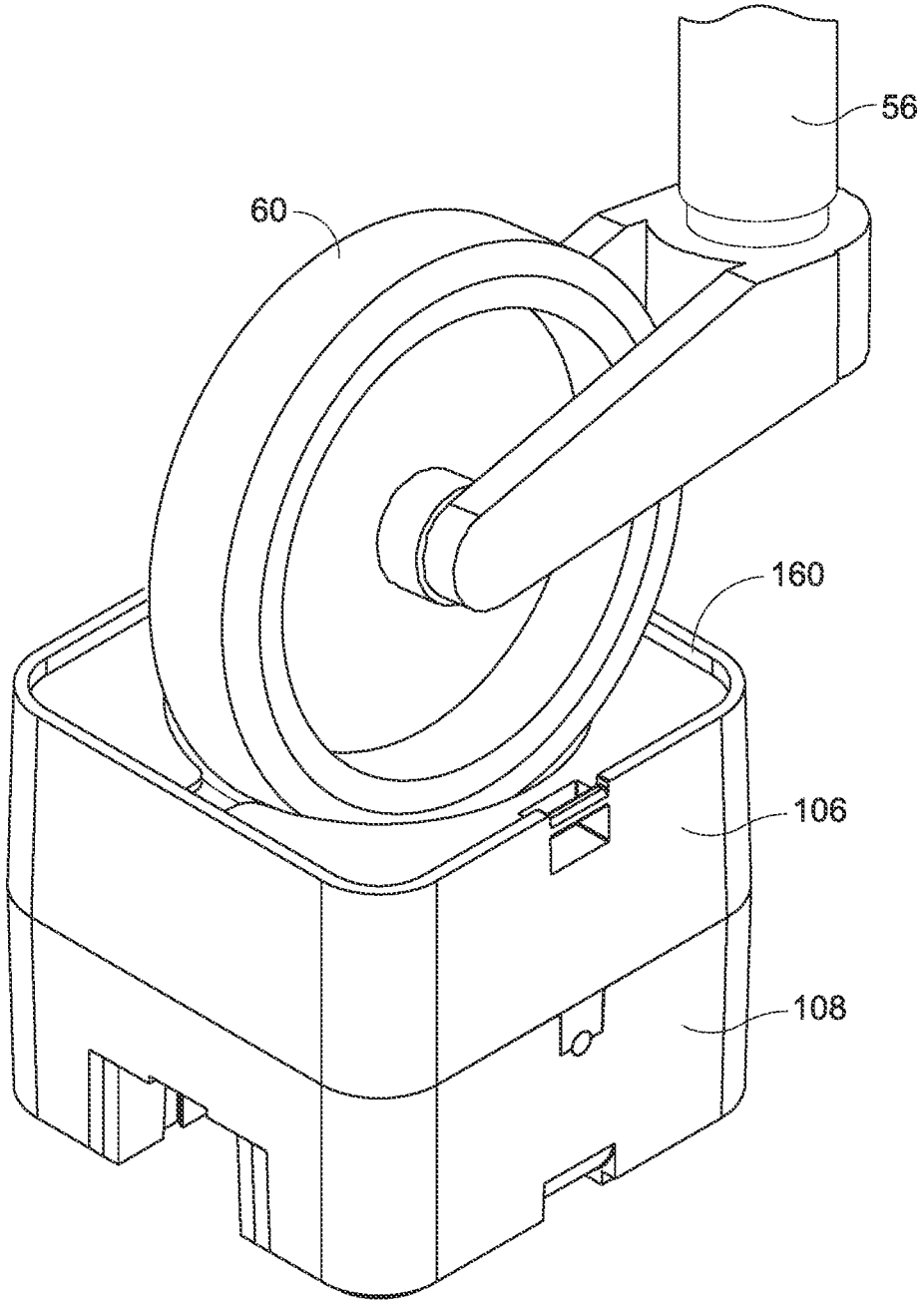
FIG. 20 illustrates a perspective view of a jack wheel of the trailer of FIG. 3, as stabilized upon the stabilizing block of FIGS. 1-2 having the top insert removed.

As shown in FIG. 9, a top side 154 of the stabilizing block 102 is formed by a top side of the upper body 106. In this embodiment, the top side 154 of the stabilizing block 102 may include a gradually recessed wheel dock 156 configured to receive and cradle a jack wheel 60 attached to a distal end of the trailer jack post 56, as shown in FIG. 20. The gradually recessed wheel dock 156 may accommodate jack wheels 60 of varying diameter, up to and including a 10-inch diameter. In one embodiment, the gradually recessed wheel dock 156 may terminate in a dual jack post cutout 158 configured to receive a distal end of either a round or a square jack post that does not terminate in a wheel. In one embodiment, the dual jack post cutout 158 may accommodate a round jack post having up to a 2.75-inch diameter or a square jack post having up to a 2.5-inch maximum width.

The top side 154 may also include a perimeter lip 160 that orders the top side 154 and forms a recess configured to retain a plate jack stand or foot 58, with our without installation of the top insert, as shown in FIG. 22. In one embodiment, the perimeter lip 160 may have a 0.25-inch width, enabling the top side to accommodate up to a 6.5-inch square footprint of the plate jack stand 58. In other embodiments, plate jack stands 58 with larger footprints may be disposed on top of the perimeter lip 160 such that they exceed the boundaries of the stabilizing block 102.

Opposing top rectangular notches 162 may be recessed into opposite ends of the top side 154. In one embodiment, the top rectangular notches 162 may be rounded and configured to receive a securement strap 62 such as, for example, a bungee cord that wraps beneath the trailer frame 52 to affix the stabilizing block 102 to the frame 52, as shown in FIG. 4, where a pair of hook ends 64 of the securement strap 62 may leverage against a top surface 155 of the upper body 106 at the top side 154 of the stabilizing block 102 to secure the strap or cord 62 in place. In one embodiment, a combination lock (not shown) may be used as an added accessory for theft protection. The combination lock may be secured adjacent to the securement strap or cord 62 and secured at the rectangular notch 162/top surface 155 of the upper body 106. In another embodiment, the top side 154 may incorporate a level (not shown) to indicate whether the trailer 50 is level.

Figure 10:
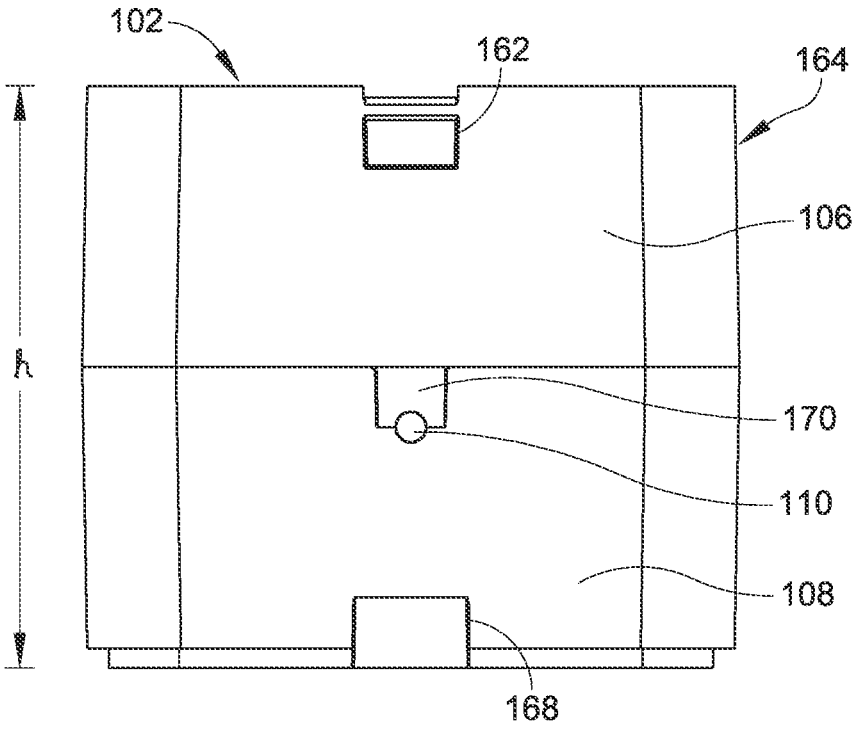
FIG. 10 illustrates a front plan view of the stabilizing block of FIG. 9.
Figure 11:
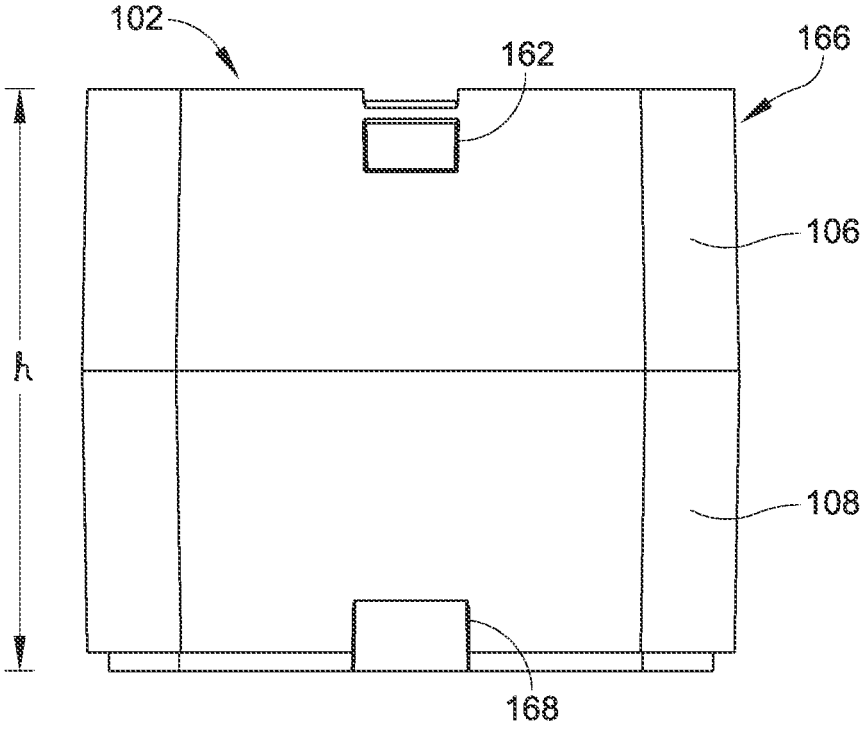
FIG. 11 illustrates a rear plan view of the stabilizing block of FIG. 9.

FIGS. 10-11 illustrate respective plan views of a front side 164 and a rear side 166 of one embodiment of the stabilizing block 102, formed by the mated upper and lower bodies 106, 108. In this embodiment, both of the front and the rear sides 164, 166 may include the top rectangular notches 162, discussed above, as well as a pair of opposing bottom rectangular notches 168, which may each have a rounded or beveled profile configured to receives the securement strap or cord 62 of FIG. 4. In addition, the front side 164 may include an enclosure tab 170 extending downward from the upper body 106 and configured to enclose an end of the rib pack insert 110.

Figure 12:
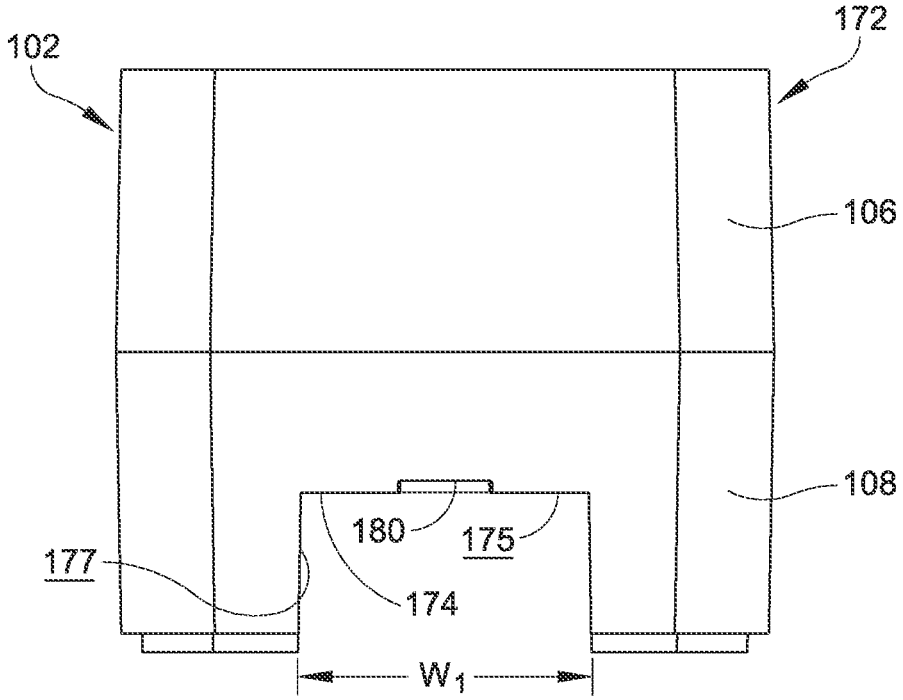
FIG. 12 illustrates a plan view of the identical left and right sides of the stabilizing block of FIG. 9.

FIG. 12 illustrates a plan view of identical left/right sides 172 of one embodiment of the stabilizing block 102, formed by the mated upper and lower bodies 106, 108. The left/right sides 172 reveal a center groove 174 within the lower body 108. In this embodiment, the center groove 174 may form a base surface 175 and two opposing walls 177 configured to ride on the trailer frame 52 when the stabilizing block 102 is not in use. In one embodiment, the center groove 174 may have a 3-inch width, $w_1$, between the two opposing walls 177.

Figure 13:
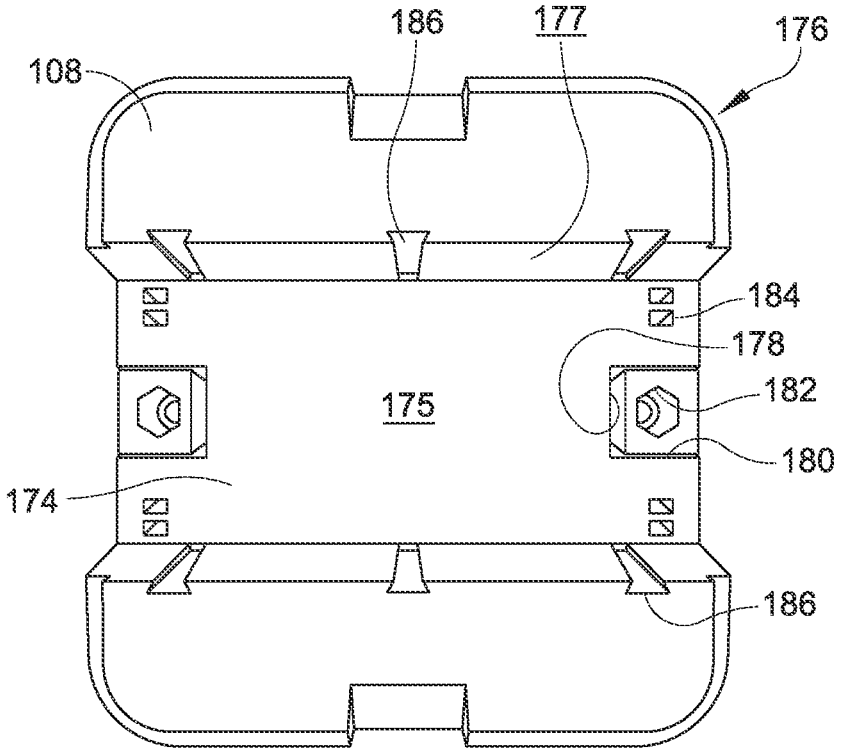
FIG. 13 illustrates a bottom plan view of the stabilizing block of FIG. 9.
Figure 14:
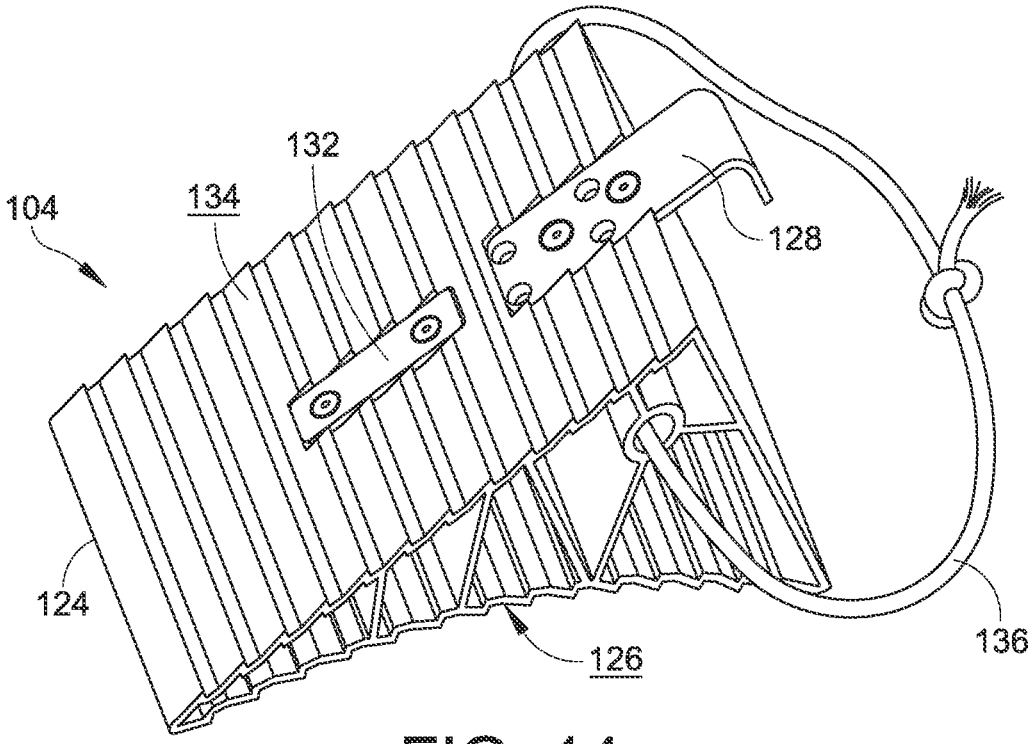
FIG. 14 illustrates a bottom perspective view of the wheel chock assembly of FIG. 1.
Figure 15:
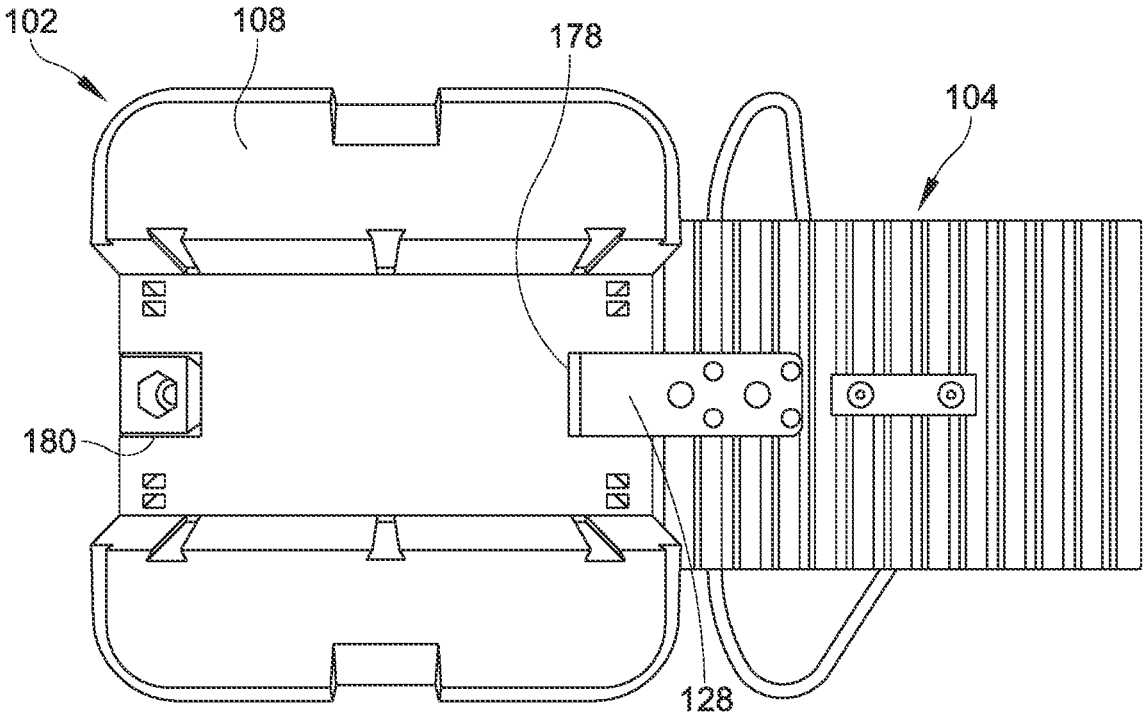
FIG. 15 illustrates a bottom plan view of the stabilizing accessory system of FIG. 1, detailing the wheel chock when [assembly] detachably attached to the stabilizing block.

FIG. 13 illustrates a plan view of a bottom side 176 of one embodiment of the stabilizing block 102, formed by the lower body 108 and further detailing an exemplary configuration of the center groove 174. Specifically, the base surface 175 of the center groove 174 may form opposing wheel chock slots 178 sized to receive the 90-degree integration hook 128 of the wheel chock assembly 104, as shown in FIGS. 14-15. Each end of the base surface 175 of the center groove 174 may include one of the wheel chock slots 178, enabling one of the wheel chock assemblies 104 to be detachably attached at either (or both) of the left and right sides 172 of the stabilizing block 102. Adjacent to each of the wheel chock slots 178, the base surface 175 of the center groove 174 may feature opposing wheel chock recesses 180, which receive the 90-degree integration hooks 128 such that they are set into and flush with the base surface 175 of the center groove 174 when the wheel chock assembly 104 is detachably attached to the stabilizing block 102. A hex hole 182 may extend inward from each of the wheel chock recesses 180. The hex holes 182 may be sized to receive the nuts 118 securing the upper body 106 to the lower body 108 via the fasteners 116, as discussed above.

In this embodiment, the base surface 175 may form up to eight spacer notches 184, and each of the two opposing walls 177 of the center groove 174 may form a plurality of spacer slots 186. The spacer notches 184 and the spacer slots 186 may each be configured to receive corresponding and aligned coupling features built into the tension fit spacers 122, shown in the exploded view of FIG. 2 and the assembled perspective view of FIG. 16. As shown and in this embodiment, each of the tension fit spacers 122 may have a dovetail side 188 featuring three projections 190 and a notched side 192 featuring three notches 194. Each spacer 122 may also include two releasable tabs 196 extending upward therefrom. In one embodiment, each of the tension fit spacers 122 may have a width, $w_2$, of 0.25 inches.

Figure 16:
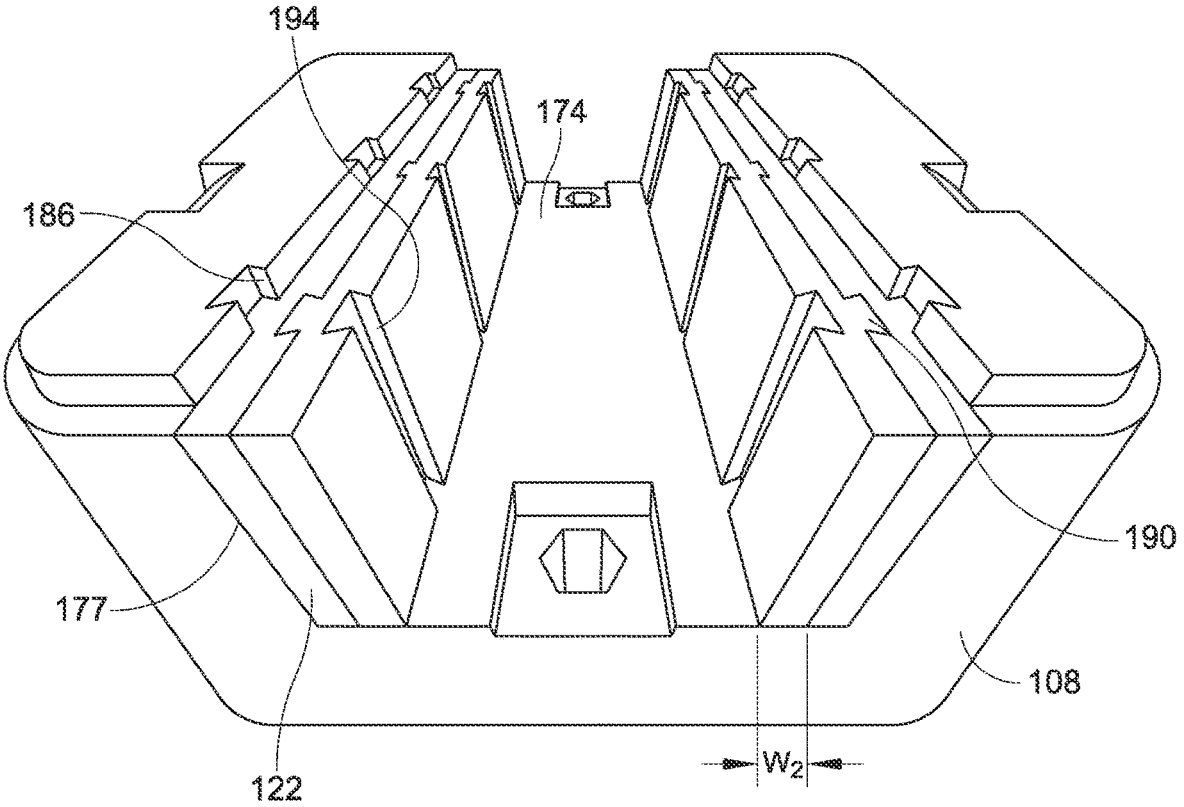
FIG. 16 illustrates a bottom perspective view of the stabilizing block of FIGS. 1-2, with a plurality of tension fit spacers installed along opposing sidewalls of a center groove of the stabilizing block.

By installing the tension fit spacers 122 along the sidewalls 177 of the center groove 174, a user may adjust the width, $w_1$, of the center groove 174 such that the groove 174 may accommodate a variety of widths of the trailer frame 52. For example, as shown in FIG. 16, two of the tension fit spacers 122 may be installed adjacent to each of the opposing walls 177 of the center groove 174 by inserting the releasable tabs 196 (FIG. 2) of the spacers 122 into the spacer notches 184 in the base surface 175 of the center groove 174 (FIG. 13) and by inserting the three dovetail projections 190 of the spacers 122 into the corresponding spacer slots 186 of the walls 177 of the groove 174 or, if one of the spacers 122 has previously been installed, into the corresponding notches 194 of the adjacent tension fit spacer 122. In this regard, the stabilizing block 102 may be adjusted such that the center groove 174 may accommodate frame widths of 2, 2.5, and 3 inches.

Figure 17:
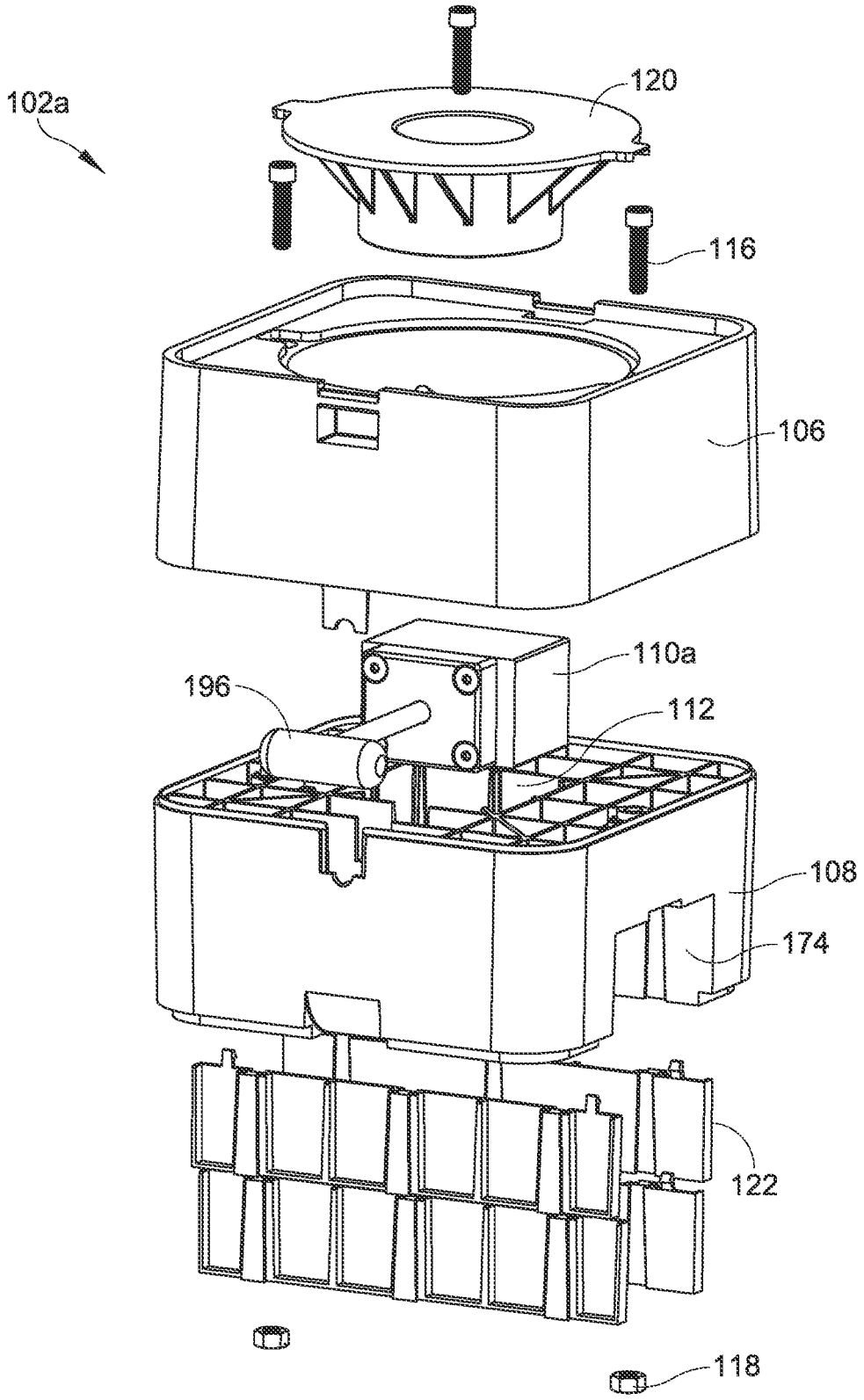
FIG. 17 illustrates an exploded view of another embodiment of a stabilizing block for a trailer stabilizing accessory system having a switchable magnet installed within a lower body of the stabilizing block.
Figure 18:
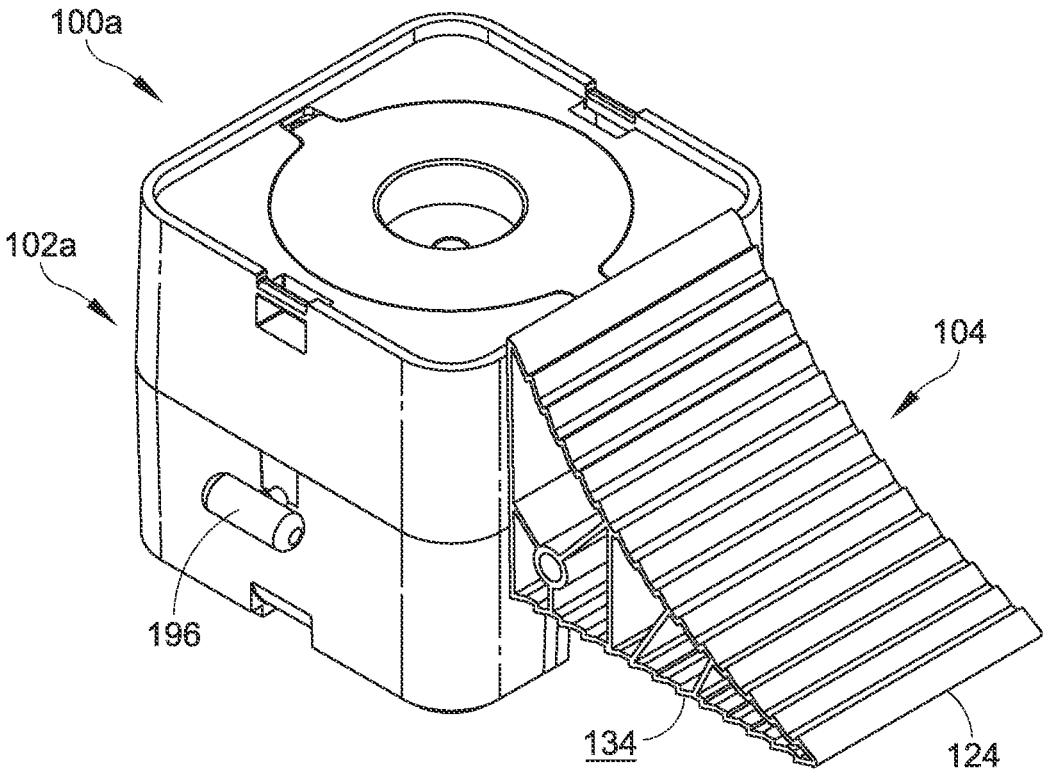
FIG. 18 illustrates a perspective view of another embodiment of a stabilizing accessory system including the stabilizing block of FIG. 17.
Figure 19:
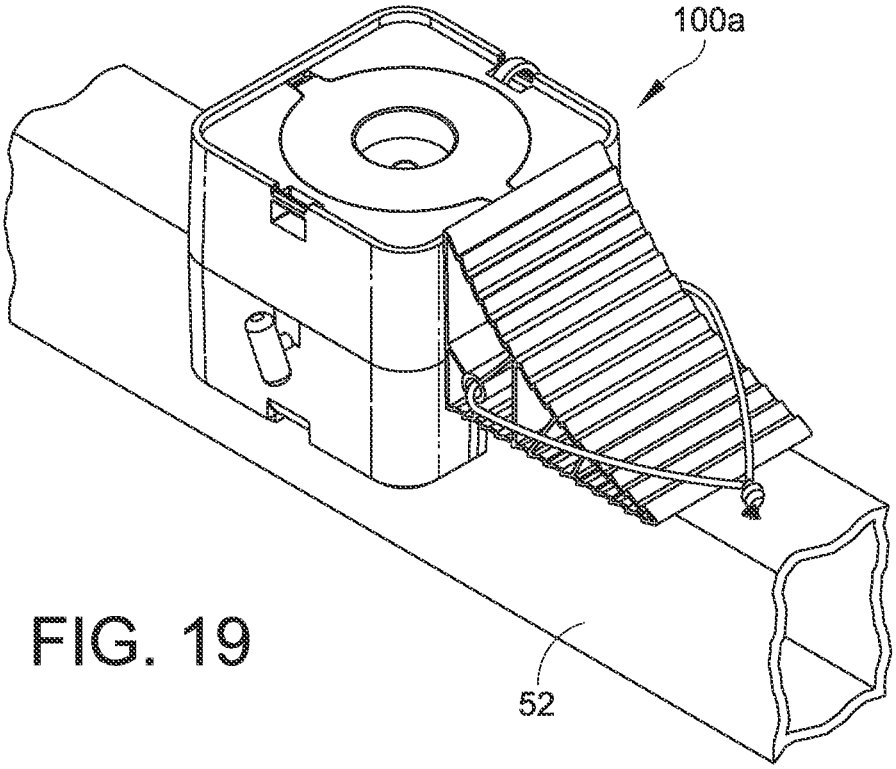
FIG. 19 illustrates a perspective view of the stabilizing accessory system of FIG. 18, as stowed upon a trailer frame using the switchable magnet of FIG. 17.

As discussed above and in one embodiment, the rib pack insert 110 may be replaced by a switchable magnet insert 110a. In this regard, FIG. 17 illustrates an exploded view of one embodiment of a stabilizing block 102a, and FIG. 18 provides a perspective view of one embodiment of a stabilizing accessory system 100a including the stabilizing block 102a including the switchable magnet insert 110a. In this embodiment, the stabilizing block 102a and the stabilizing accessory system 100a are identical to the stabilizing block 102 and stabilizing accessory system 100, discussed above, with the exception of the switchable magnet insert 110a in the position of the rib pack insert 110. In this embodiment, the switchable magnet insert 110a may be press fit or be otherwise installed within the insert compartment 112 of the lower body 108 in any appropriate manner that places the magnet 110a in appropriate proximity to the base surface 175 of the center groove 174, such that the magnet is positioned to provide the requisite securement force that attaches the stabilization block 102a to the steel trailer frame 52, as shown in FIG. 19, and that exposes an actuator, such as, for example, a handle 196 of the magnet insert 110a to the user.

In one embodiment, the switchable magnet insert 110a may be any appropriate commercially available switched magnet such as, for example, a Magswitch Magsquare 400, having a magnetic strength of 400 lbs. when upright and engaged, and having a pull force of approximately 100 lbs. when the magnet insert 110a is positioned on its side and operating through the base surface 175 of the center groove 174 (i.e., operating through the air/plastic gap created by the base surface 175 of the center groove 174). The handle provided with the commercially available switchable magnet may be modified as necessary to allow the handle 196 to protrude from the stabilization block 102a. In other embodiments, the actuator may be a switch, a lever, a wireless electronic actuator, or any other appropriate user-actuatable mechanism that allows a user to control the magnet insert 110a to switch between an "engaged" state of the magnet insert 110a and a "disengaged" state of the magnet insert 110a. Thus, using the rectangular magnet 132 recessed into the bottom surface 134 of the wheel chock 124 and the switchable magnet insert 110a embedded into the stabilizing block 102a, the entirety of the stabilization accessory system 100a may be magnetically attached to the steel trailer frame 52 on any rail portion that is three inches wide or less, as shown in FIG. 19.

Additionally, embodiments of the stabilizing block 102, 102a or the integrated stabilizing accessory system 100, 100a may ride on surfaces other than the trailer frame 52, so long as those surfaces have a width that may be accommodated by the center groove 174 (e.g., a width of three inches or less) of the stabilizing block 102, 102a. For example, the stabilizing block 102a may ride on a truck bumper. Further, the stabilizing block may be attached to an aluminum trailer frame or another aluminum surface through the attachment of a steel "sandwich" plate to the frame. In addition, embodiments of the stabilizing block 102, 102a may be paired with two wheel or tire chock assemblies 104, one on each side of the block 102, 102a, as necessary and/or desired to stabilizing more than one trailer tire when the trailer 50 is not in transport.

Figure 24:
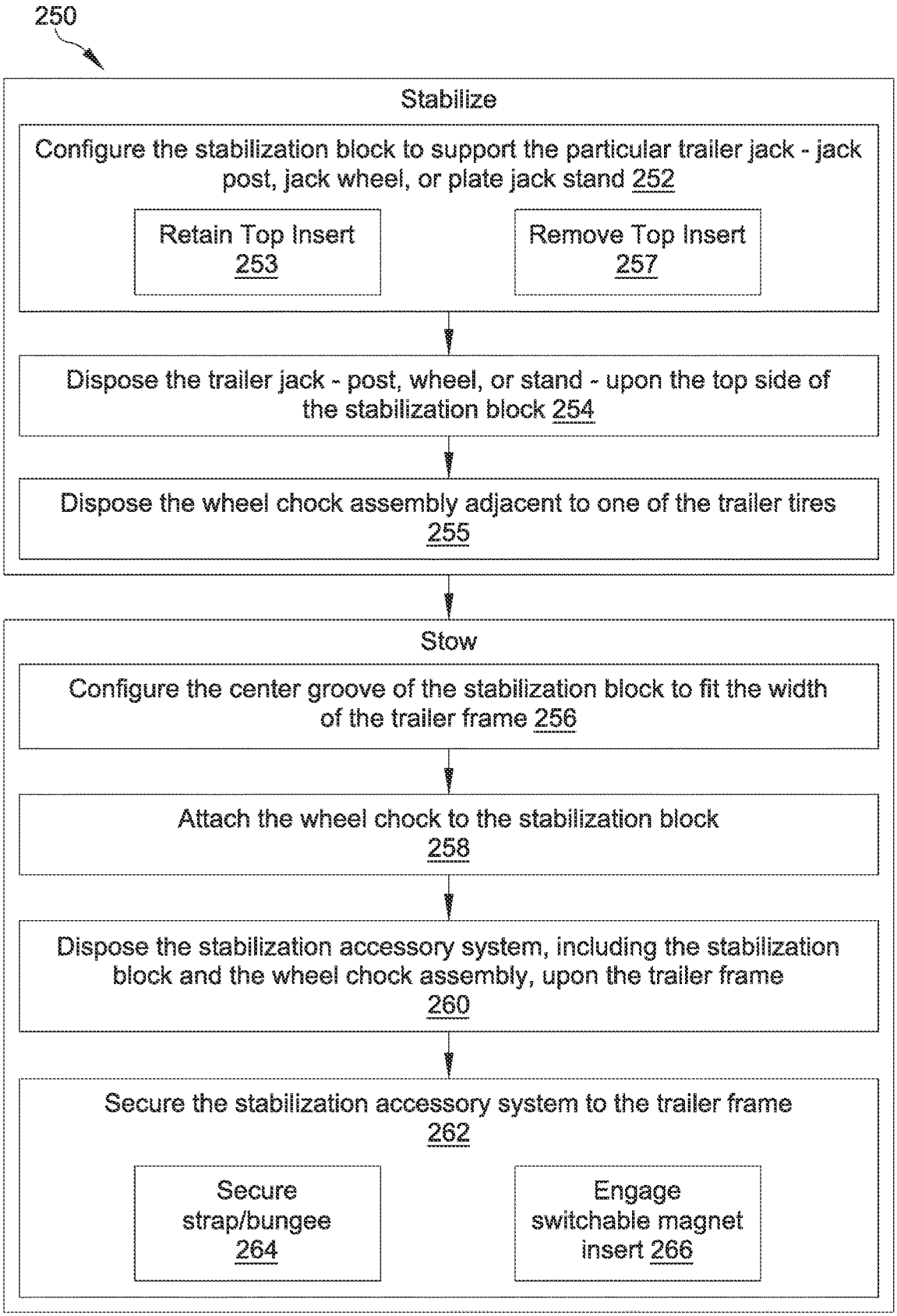
FIG. 24 provides a flowchart depicting an exemplary method of stabilizing a trailer using embodiments of a trailer stabilizing accessory system, as shown in FIGS. 1-2 and 17-18, and of stowing the stabilizing accessory system upon the trailer for transport.

As discussed above, the entirety of embodiments of the stabilizing accessory system 100, 100a is configured for direct attachment to or stowing upon a trailer frame for transport and/or storage between stabilizing uses. FIG. 24 provides a flowchart depicting an exemplary method (250) of employing embodiments of the stabilization accessory system 100, 100a to stabilize a towed trailer when the trailer is not hitched to a towing vehicle and to stow the stabilization accessory system 100, 100a upon a frame of the trailer when the system 100, 100a is not in use.

The method (250) may begin with configuring the stabilization block 102, 102a for the particular trailer jack to be stabilized—either a square or round jack post 56, a jack wheel 60, or a plate jack stand 58 (252). In this regard, the top insert 120 may be left in place (253) to stabilize plate jack stands 58 of varying sizes or smaller jack posts or removed (257) as appropriate to accommodate round or square jack posts of varying sizes and jack wheels of varying sizes. Once the stabilizing block 102, 102a is configured for the particular trailer, the trailer jack—post, wheel, or stand—may be disposed upon the top side 154 of the stabilizing block 102, 102a (254) by lowering the jack onto the stabilizing block 102, 102a until the trailer lifts off the ball mount of the towing vehicle. In one embodiment, two blocks 102, 102a may be stacked to provide an optimal stabilization height, thereby reducing the amount of work necessary to raise the trailer for reattachment to the towing vehicle.

In addition to stabilizing the trailer jack, the wheel chock assembly 104 may be placed adjacent to one of the trailer tires 54 such that the upper surface 126 of the wheel chock 124 confronts the tire surface (255). Once stabilized, the trailer may sit indefinitely in its secured and stabilized position, without fear of sinking, rolling, or other types of destabilization.

To stow embodiments of the stabilization accessory system [102, 102a] *100, 100a* for transit after the ball mount on the towing vehicle is again secured to the trailer 50 and the jack is fully raised, the center groove 174 of the stabilization block 102, 102a may be configured to fit the width of the particular trailer frame 52 (e.g., 2 inch, 2.5 inch, 3 inch) by installing, if necessary, an appropriate number of the tension fit spacers 122 upon the walls 177 of the center groove 174 (256). Then the wheel chock assembly 104 and the stabilization block 102, 102a may be detachably attached via inserting the 90-degree integration hook 128 within one of the wheel chock slots 178 (258) before the stabilizing block 102, 102a and the wheel chock assembly 104 are placed upon the frame 52 such that the base surface 175 of the center groove 174 and the bottom surface 134 of the wheel chock 124 confront the trailer frame 52 (260).

Once the stabilization system 100, 100a is in position, it may be secured to the frame (262), either by securing the securement strap or cord 62 about the frame and top rectangular notches 162 of the block 102, as shown and discussed in relation to FIG. 4 (264), or by switching the magnet insert 110a of the block 102a from a disengaged to an engaged state via the handle 196, as shown [in] *and* discussed in relation to FIG. 19 (266). Once secured upon the trailer frame 52, the stabilizing accessory system is prepared for transport. The system 100, 100a travels with the frame without the need to carry the system or its components within the towing vehicle. The stabilizing block and the tire chock are ready for use at any time and conveniently located within inches of the trailer jack in an easily accessible configuration that enables the user to quickly remove the system from the trailer frame for stabilizing use with a variety of trailer jack geometries.

Embodiments of the components of the trailer stabilization system(s) discussed above may be formed of one or more hard, durable plastics that are formulated to withstand deteriorating UV damage, that will not scratch or otherwise damage the underlying trailer frame or other attachment surfaces, and that may support at least 1400 lbs. (the Class IV hitch tongue weight rating) during stabilizing use. For example, embodiments of the top insert 120, the upper body 106, the lower body 108, the rib pack insert 110, the tension fit spacers 122, and the wheel chock 124 may be formed of twenty percent glass filled polypropylene with a UV inhibitor. The components may be manufactured using any appropriate manufacturing process, including, for example, an injection molding process and/or a 3D printing process.

Further, the specific shapes, sizes, types, and dimensions of the stabilizing trailer systems aid their components discussed above are provided for illustrative purposes only, and an ordinarily skilled artisan is assumed to understand that the components of the system embodiments, and the particular features and configurations thereof, may take any appropriate size, shape, type, dimension, and/or configuration as necessary to carry out the integrated trailer-attachment and stabilization purposes described herein. For example, a stabilizing block is described as a cube-type configuration, but the shape of the stabilizing components, the number of sides, the center grooves, the post recesses, and/or any number of other features may vary in shape, size, type, and/or configuration.

Embodiments of the trailer stabilizing systems described above provide a uniquely convenient solution addressing trailer stabilization and equipment storage. Embodiments of the systems ride on the frame of any standard sized trailer frame (2-inch, 2.5-inch, and 3-inch) and don't have to be transported separately inside the owner's towing vehicle. In addition, the systems serve as multifunctional stabilization tools and may be used to add height to the jack post during trailer storage to reduce the amount of post cranking required to raise and lower the jack post/wheel and, therefore, reduce the amount of work required to reattach the trailer to the towing vehicle. Further, embodiments of the trailer stabilization accessory systems provide a support mechanism for the jack wheel, as well as a round or square jack post alone or the jack plate oftentimes attached to the distal end of the jack post. This stabilization is provided while maintaining the jack post, wheel, or plate jack stand/foot off the ground and out of the dirt, mud, rocks, etc. upon which the trailer sits, thereby keeping the jack post free of debris and damage, while simultaneously increasing the footprint of the jack post and preventing sinkage. The systems also provide a mechanism to immobilize one or more *of* the trailer tires using the detachably attached wheel chock(s). The system is compact, conveniently stowed and towed, and fulfills most if not all of an owner's trailer stabilization needs in one convenient, easily-accessible, and elegant multi-purpose system.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A stabilizing accessory system for a trailer, comprising:

a stabilizing block, comprising:

*at least one of* a wheel dock configured to receive and retain a jack wheel of the trailer[;], a post cutout configured to receive and retain a distal end of a jack post of the trailer[;], *and* a plate recess configured to receive and retain a plate jack stand of the trailer; and

[a first securement mechanism for securing the stabilizing block to a frame of the trailer; and a wheel chock detachably attached to the stabilizing block, the wheel chock configured to immobilize a tire of the trailer;]

wherein a [bottom] side of the stabilizing block forms a center groove configured to receive [the] *a* frame of the trailer; and

[wherein] *further comprising a plurality of tension fit spacers having projections for detachable attachment to notches in opposite sidewalls of the center groove for adjusting the width of the center groove such that* the center groove is adjustable between a first width configured to accommodate a first frame width[,] *and* a second width configured to accommodate a second frame width[, and a third width configured to accommodate a third frame width],

*wherein the plurality of tension fit spacers also have notches, with the notches and the projections of the tension fit spacers configuring the tension fit spacers for detachable attachment to one another.*

[2. The stabilizing accessory system of claim 1, wherein the stabilizing block further comprises a plurality of tension fit spacers, each of the plurality of the tension fit spacers configured for selective installation adjacent to a sidewall of the center groove for adjusting the center groove between the first, the second, and the third widths.]

3. The stabilizing accessory system of claim 1, [wherein the first securement mechanism comprises] *further including* a securement strap configured to secure the frame of the trailer within the center groove such that the stabilizing block is secured to the frame of the trailer.

4. The stabilizing accessory system of claim 1, [wherein the first securement mechanism comprises] *further including* a switchable magnet [embedded] within the stabilizing block, and wherein when the switchable magnet is in an engaged state, the frame of the trailer is secured within the center groove such that the stabilizing block is secured to the frame of the trailer, and when the switchable magnet is in a disengaged state, the stabilizing block is released from the frame of the trailer.

5. The stabilizing accessory system of claim 1, [wherein the wheel chock further includes an integration hook extending from a bottom surface of the wheel chock to a bottom surface of the stabilizing block] *further including a wheel chock detachably attached to the stabilizing block, the wheel chock configured to immobilize a tire of the trailer.*

6. The stabilizing accessory system of claim [1] *5*, wherein the stabilizing block and the wheel chock are formed of [20% glass filled polypropylene combined with a UV inhibitor] *plastic*.

7. The stabilizing accessory system of claim [1] *5*, wherein the wheel chock has a [second] securement mechanism for securing the wheel chock to the frame of the trailer.

8. The stabilizing accessory system of claim 7, wherein the [second] securement mechanism comprises a passive magnet embedded within [a bottom surface of] the wheel chock.

9. The stabilizing accessory system of claim [1] *5*, wherein the wheel chock [further includes an integration hook having a built-in] *has a* projection [extending from a bottom surface thereof and] configured for selective attachment to the stabilizing block.

10. A stabilizing accessory system for a towed trailer, comprising:

a wheel chock detachably attached to a trailer stabilizing [accessory] *block*, [the trailer stabilizing accessory configured to selectively elevate and support each of a jack wheel, a jack post, and a plate jack stand,] wherein the wheel chock and the trailer stabilizing [accessory] *block are configured to* attach directly to a frame of the towed trailer for transport[when not in use];

wherein the [trailer stabilizing accessory comprises a] trailer stabilizing block *is configured* for placement beneath a jack of the towed trailer, the trailer stabilizing block comprising:

an upper body having *at least one of* a recessed wheel dock configured to receive [the] *and selectively elevate and support a* jack wheel, a jack post cutout configured to [selectively] receive [each of a round distal end of the jack post and a square] *and selectively elevate and support a* distal end of [the] *a* jack post, and a plate recess configured to receive [the] *and selectively elevate and support a* plate jack stand; and a lower body attached to the upper body; and wherein the lower body forms a center groove having a base surface and opposing sidewalls, the opposing sidewalls separated by a width [that approximates a width of] *sized to receive* the frame *therein* such that when the stabilizing block is secured to the frame, the base surface of the center groove opposes and confronts the frame, *and*

*further comprising a plurality of tension fit spacers configured for dovetail attachment to the opposing sidewalls of the center groove of the lower body, wherein the dovetail attachment includes dovetail projections on the tension fit spacers configured for detachable attachment to corresponding notches in the opposing sidewalls of the center groove, and wherein attachment of the plurality of the tension fit spacers narrows the width separating the opposing sidewalls of the center groove such that the center groove is adjustable to accommodate different trailer frame widths.*

[11. The stabilizing accessory system of claim 10, further comprising a plurality of tension fit spacers, each configured for detachable attachment to one of the opposing sidewalls of the center groove of the lower body, wherein selective attachment of one or more of the plurality of the tension fit spacers narrows the width separating the opposing sidewalls of the center groove such that the center groove accommodates varying frame widths.]

12. The stabilizing accessory system of claim 10, further comprising a securement strap configured for securing the trailer stabilizing block to the frame of the towed trailer such that the base surface of the center groove opposes and confronts the frame of the towed trailer.

13. The stabilizing accessory system of claim 10, further comprising a switchable magnet installed within the lower body of the trailer stabilizing block, wherein when the switchable magnet is in an engaged position, the stabilizing block is secured to the frame of the towed trailer such that the base surface of the center groove opposes and confronts the frame of the towed trailer.

14. A method of stabilizing a towed trailer using a trailer stabilizing accessory system including a [wheel chock and a] stabilizing block, the method comprising:

when the towed trailer is not in transport:

using the stabilizing block, stabilizing one of a [square jack post, a round] jack post, a jack wheel, or a plate jack stand of the towed trailer; and

[using the wheel chock, stabilizing a tire of the towed trailer; and]

when the towed trailer is in transport:

securing the stabilizing block [and the wheel chock] to a frame of the towed trailer;

wherein the securing the stabilizing block [and the wheel chock] to the frame of the towed trailer comprises:

selectively attaching [one or more] spacers [along one or more] *in a dovetail attachment to opposite* sidewalls of a center groove formed within a [bottom] side of the stabilizing block to adjust the stabilizing block to accommodate a width of the frame of the towed trailer, *wherein the selectively attaching the spacers includes inserting dovetail projections on the spacers into corresponding notches in the opposite sidewalls of the center groove.*

15. The method of claim 14, wherein:

the stabilizing the one of the [square jack post, the round] jack post, the jack wheel, or the plate jack stand of the towed trailer comprises:

manually configuring a top side of the stabilizing block to receive the one of the [square jack post, the round] jack post, the jack wheel, or the plate jack stand; and disposing the [square jack post, the round] jack post, the jack wheel, or the plate jack stand upon the top side of the stabilizing block; and

[the] *further including* stabilizing [the] *a* tire of the towed trailer [comprises:] *by* disposing [the] *a* wheel chock adjacent to the tire of the towed trailer such that the tire confronts an upper surface of the wheel chock.

16. The method of claim [14] *15*, further comprising:

*when the towed trailer is in transport,* using an integration accessory, detachably attaching the wheel chock to the stabilizing block.

17. The method of claim 16, further comprising:

disposing the stabilizing block and the detachably attached wheel chock upon the frame of the towed trailer such that the frame is received within the center groove of the stabilizing block; and using a securement strap, securing the stabilizing block to the frame.

18. The method of claim 16, further comprising:

disposing the stabilizing block and the detachably attached wheel chock upon the frame of the towed trailer such that the frame is received within the center groove of the stabilizing block; and engaging a switchable magnet embedded within the stabilizing block to secure the stabilizing block to the frame.

*19. The method of claim 16, further comprising:*

*disposing the stabilizing block, with the wheel chock attached thereto, on the frame of the towed trailer such that the frame is received within the center groove of the stabilizing block; and*

*securing the stabilizing block to the frame with a strap, cord, or magnet to releasably maintain the stabilizing block and wheel chock secured to the frame by confronting the wheel chock and the stabilizing block with the frame when the frame is received within the center groove of the stabilizing block.*

*20. The stabilizing accessory system of claim 5, further including an integration hook extending from the wheel chock, wherein the integration hook is configured for receipt in a slot of the stabilizing block to detachably attach the wheel chock to the stabilizing block.*

* * * * *